3,522,316
Patented July 28, 1970

3,522,316
THIOBIS INDANOL AND NAPHTHOL COMPOUNDS
Ralph Arthur Coleman, Middlesex, Frank Meritt Furman, Bridgewater Township, Somerset County, and Jerry Peter Milionis, Franklin Township, Somerset County, N.J., assignors to American Cyanamid Company, Stamford, Conn., a corporation of Maine
No Drawing. Original application Apr. 1, 1964, Ser. No. 356,644, now Patent No. 3,364,174, dated Jan. 16, 1968. Divided and this application Nov. 17, 1967, Ser. No. 683,829
Int. Cl. C07c *149/36;* C08f *45/58*
U.S. Cl. 260—609     5 Claims

ABSTRACT OF THE DISCLOSURE

Substituted thiobis phenolic compounds of the structure:

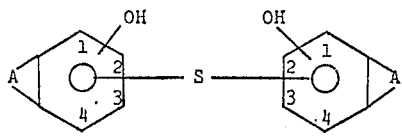

wherein A is a trimethylene or a tetramethylene radical, the hydroxy groups are either on the 1- or the 2-position, and when the hydroxy groups is in the 1-position, the —S— is attached to the 4-position. These compornds are useful as antioxidants for polyolefines. A species of these compounds is 7,7'-thiobis-(4-indanol).

---

This is a divisional application of application Ser. No. 356,644, filed Apr. 1, 1964, now U.S. Pat. 3,364,174, issued Jan. 16, 1968.

This invention relates to new thiobis phenolic derivatives and, more particularly, to thiobis aromatic hydroxy compounds represented by the Formula I:

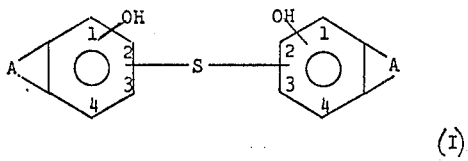

(I)

wherein A is a trimethylene or a tetramethylene radical. The hydroxy groups may be either on the 1- or the 2-position; and when the hydroxy group is in the 1-position, the —S— is attached to the 4-position.

The new compounds are useful as antioxidants in various types of polymeric systems, particularly polyolefins. They are effective at low concentrations, soluble in polyolefins and are heat stable. Thus, they can be milled into polyolefin formulations at high temperatures without losing effectiveness.

The compounds of this invention are conveniently prepared by the reaction of a 5,6,7,8-tetrahydro naphthol or an inandol with sulfur dichloride (SCl₂) in an inert solvent such as benzene, hexane, methyl cyclohexane and diethyl ether. The reaction proceeds readily at room temperature, but warming to temperatures of 40° C. or 50° C. speeds the reaction. In some instances, a catalyst (such as aluminum chloride) may be used to give improved results.

The reaction between sulfur dichloride and the indanol or tetrahydronaphthol may give mixtures of isomeric products in which the thio bridge is attached in different positions. For example, when 5,6,7,8-tetrahydro-2-naphthol is reacted with sulfur dichloride, a mixture of isomers actually reuslts, attack taking place in the 1- and 3-positions, resulting in a mixture of the 1,1'-isomer, the 3,3'-isomer and the 1,3'-isomer. From this mixture, the 3,3'-thiobis naphthol and the corresponding 1,1'-isomer may easily be isolated in the pure state.

When 5,6,7,8-tetrahydro-1-naphthol is reacted with sulfur dichloride at room temperature, substantially only the 4,4'-isomer is obtained.

In the reaction of the indanols with sulfur chloride, the sulfur attachment is in the 4-position when the phenolic group is in the 1-position. When the phenolic group is in the 2-position, the sulfur attaches to the 3-position.

In all of the above preparations, completion of the reaction is evidenced by the precipitation of the product and also substantial decrease in the evolution of hydrogen chloride.

The compounds of this invention may be used alone or in isomeric mixtures as obtained above. They are especially useful in polyolefins such as polyethylene, polypropylene, polybutylenes and copolymers thereof. However, they are useful in polymeric materials such as polyvinyl chloride, polystyrene, acrylonitrile, butadiene-styrene copolymers, polyacrylates, nylon and other polyamides, etc.; and also in other organic compositions subject to deterioration by oxidative attack such as gasoline, lubricating oils, waxes, lard, rubber, etc.

For the purpose of protection against oxidative deterioration, the compounds of this invention are incorporated into the substrate material in an amount of broadly about 0.001 to 5.0% and, specifically, about 0.05 to about 1.0%, based on the weight of the total stabilized composition.

The invention is further illustrated by the examples which follow. Parts and percentages are on a weight basis unless otherwise specified.

EXAMPLE 1

3,3'-thiobis(5,6,7,8-tetrahydro-2-naphthol)

In a 250-ml. flask are charged: 74 g. (0.5 mole) 5,6,7,8-tetrahydro-2-naphthol; 100 ml. ethylenedichloride; and slowly 50 g. (0.37 mole) aluminum chloride; then 31.8 ml. (0.5 mole) sulfur dichloride.

After stirring for 24 hours at room temperature, the mixture is drowned in one liter of water and 50 ml. of concentrated hydrochloric acid. The ethylene-dichloride is evaporated off on a steam bath and water is removed by decantation. Tar is extracted with two liters of water containing 100 ml. of 20% caustic. The extract is acidified and liquor is decanted from the tar that forms. After trituration with about 25 ml. of methanol, the solid is filtered off and hexane-washed. This material is purified by dissolving in 25 ml. of benzene and activated charcoal and reprecipitating with 25 ml. of hexane. A buff-white product (M.P. 174–176° C.) is obtained.

EXAMPLE 2

1,1'-thiobis-(5,6,7,8-tetrahydro-2-naphthol)

Into a 1-liter flask (stirrer, nitrogen blanket, ice bath) are charged: 162.8 g. (1.1 m.) 5,6,7,8-tetrahydro-2-naphthol; 250.0 ml. ethyl ether.

When the solid dissolves, the solution is cooled to 5° C. and a solution of: 31.6 ml. (0.5 m.) sulfur dichloride in 50.0 ml. ethyl ether is added in one hour at 5° C.

After stirring overnight at room temperature, almost all of the ether is evaporated under tap vacuum on a warm steam bath. Methylcyclohexane (250 ml.) is added. The mixture is cooled and permitted to stand. The product is filtered off and washed with hexane. The white solid (M.P. 178–184° C.) is recrystallized from 300 ml. of CH₃OH, giving the product (M.P. 191–193° C.).

EXAMPLE 3

Thiobis-5,6,7,8-tetrahydro-2-naphthol (mixture of 1,1'-isomer, 1,3'-isomer and 3,3'-isomer)

In a 2-liter flask (stirrer, nitrogen blanket) are charged: 266 g. (1.8 mole) tetrahydro-2-naphthol; 450 ml. methylcyclohexane.

To this, at 40° C. in 45 minutes, there is added dropwise, a solution consisting of: 75 ml. methylcyclohexane; 47.4 ml. (0.75 mole) sulfurdichloride.

After stirring overnight at 40° C., 300 ml. of hexane is added and the mixture is cooled to 10° C. The product is filtered off and washed with hexane. A gray white solid (M.P. 100–110° C.) is obtained after air-drying.

EXAMPLE 4

4,4'-thiobis(5,6,7,8-tetrahydro-1-naphthol)

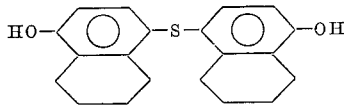

To a solution of 1.4 grams 5,6,7,8-tetrahydro-1-naphthol in 10 ml. benzene is added, dropwise, a solution of 1.0 gram sulfur dichloride in 5 ml. benzene. The product, 4,4'-thiobis-(5,6,7,8-tetrahydro-1 - naphthol), is filtered, washed with petroleum ether and air-dried (M.P. 193–200° C.).

EXAMPLE 5

7,7'-thiobis(4-indanol)

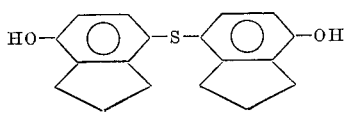

To a solution of 2.2 grams 4-indanol in 30 ml. benzene, is added, dropwise, with stirring, a solution of 2.0 grams sulfur dichloride in 20 ml. benzene. The reaction mixture is stirred for fifteen minutes and filtered. The product is isolated as a grayish-white solid (M.P. 195–204° C.).

EXAMPLE 6

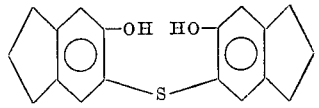

To a suspension of 6.7 grams 5-indanol in 75 ml. heptane, is added, dropwise, at room temperature, 3.0 grams sulfur dichloride in 50 ml. heptane. The reaction mixture is stirred for 60 minutes and filtered. The product, 6,6'-thiobis-(5-indanol), is purified by recrystallization from benzene (M.P. 201–203° C.).

We claim:
1. Phenolic derivatives represented by the formula:

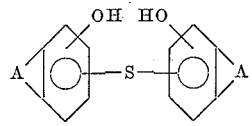

wherein A is selected from the group consisting of trimethylene and tetramethylene chains, and wherein each hydroxyl group separately is ortho or para to the sulfur bridge.

2. Naphthol derivatives as defined in claim 1 and represented by the formula:

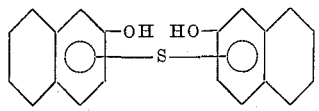

3. A naphthol derivative as defined in claim 1 and represented by the formula:

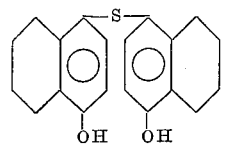

4. An indanol derivative as defined in claim 1 and represented by the formula:

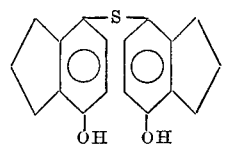

5. An indanol derivative as defined in claim 1 and represented by the formula:

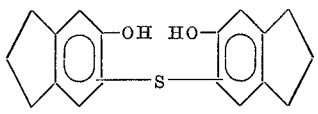

References Cited

Mousseron: "Compt. Rend.," vol. 215 (1942), pp. 357–59.

CHARLES B. PARKER, Primary Examiner

D. R. PHILLIPS, Assistant Examiner

U.S. Cl. X.R.

44—76; 252—48.2; 260—45.95, 799, 875